April 1, 1924. 1,488,720
F. TICHÝ ET AL
TOOL BOX FOR MOTOR VEHICLES
Filed Aug. 14, 1922
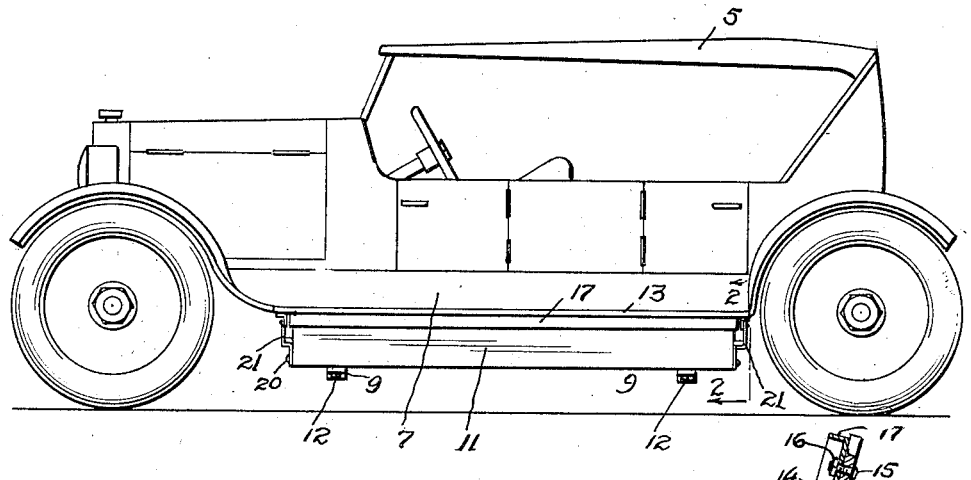
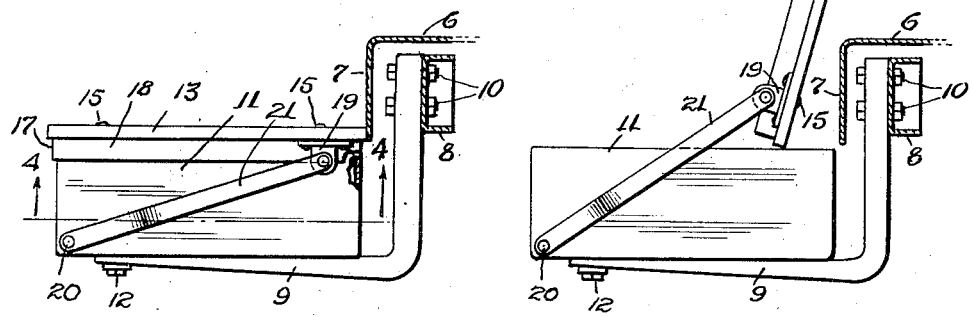
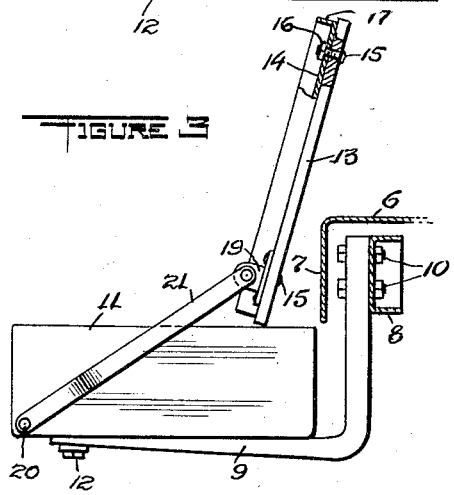
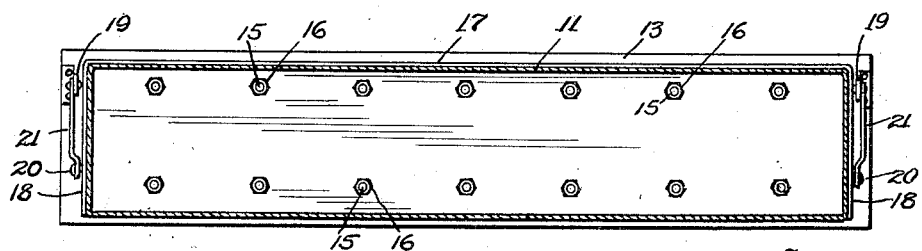
Inventors
FREDERICK TICHÝ
FREDERICK H. WAPPLER
By their Attorney
Walton Harrison Patented Apr. 1, 1924.

1,488,720

UNITED STATES PATENT OFFICE.

FREDERICK TICHÝ, OF ASTORIA, AND FREDERICK H. WAPPLER, OF ELMHURST, NEW YORK, ASSIGNORS TO WAPPLER ELECTRIC COMPANY, INC., OF LONG ISLAND CITY, NEW YORK, A CORPORATION OF NEW YORK.

TOOL BOX FOR MOTOR VEHICLES.

Application filed August 14, 1922. Serial No. 581,589.

*To all whom it may concern:*

Be it known that we, FREDERICK TICHÝ and FREDERICK H. WAPPLER, both citizens of the United States, the former residing in Astoria, in the county of Queens and State of New York, and the latter residing in Elmhurst, in the county of Queens and State of New York, have invented certain new and useful Improvements in Tool Boxes for Motor Vehicles, of which the following is a full, clear, and concise description.

Our invention relates to motor vehicles such as automobiles, our purpose being to provide the vehicle with a tool box and with certain movable parts associated with the tool box, these movable parts being so constructed, arranged and operated as to serve the double purpose of a cover for the tool box and a foldable running board for the vehicle.

Reference is made to the accompanying drawing forming a part of this specification, and in which like reference characters indicate like parts throughout the several figures.

Figure 1 is a side elevation of an automobile equipped with our invention, various movable parts being in the positions they respectively occupy when the automobile is ready for travel.

Figure 2 is a section on the line 2—2 of Figure 1, looking in the direction indicated by the arrows.

Figure 3 is a section on the same line as Figure 2, but showing the movable parts as occupying positions different from the positions indicated for them in Figure 2.

Figure 4 is a section on the line 4—4 of Figure 2, looking in the direction indicated by the arrows.

A vehicle body appears at 5, and carries a floor 6, made preferably of metal, and provided with a downwardly extending flange portion 7. The vehicle body also carries a rail 8 having in cross section the form of a channel iron, and also made preferably of sheet metal.

A pair of supporting arms 9, made of metal, preferably steel, are secured to the supporting rail 8 by means of bolts 10. A tool box 11 made of either wood or metal rests upon the supporting arm 9, to which it is secured by bolts 12.

A board 13, made of either wood or metal, serves the double purpose of a running board for the vehicle and an outer cover for the tool box. The board 13 carries a member 14, made in this instance of sheet metal, this member constituting the inner cover of the tool box, and being connected with the board 13 by means of bolts 15 and nuts 16.

The heads of the bolts 15 serve as friction studs to prevent slipping of the feet of persons stepping upon the board 13 when the latter is used as a running board. The inner cover 14 is provided with a flange 17 extending laterally from it at its outer edge, this flange being provided with a portion 18 disposed across the end of the board 13, as may be understood from Figure 4.

Thus the flange as a whole extends along three sides only of the running board 13, and as a consequence does not completely circumscribe the tool box 11 when the board 13 is in its horizontal position, or in other words when it is lowered upon the tool box, as may be understood from Figures 2 and 4.

A pair of bearings 19 are mounted upon and carried by the board 13, these bearings extending downwardly from the board when the latter is horizontal, as indicated in Figure 2. The tool box is provided with a pair of pivot pins 20. A pair of links 21 are connected with the pivot pins 20 and with the bearings 19.

When the board 13 is used as the running board of the vehicle, the movable parts of our device occupy the positions indicated for them in Figure 2, the board 13 being horizontal and its edge nearest the vehicle body being lodged squarely against the downwardly extending flange portion 7 of the floor 6, as shown in Figure 2.

With the parts in the position just described the tool box 11 may perform the function generally performed by any tool box, namely, as a receptacle for carrying various articles, including tools.

If now the board 13 be grasped by hand and shifted into the position indicated for it in Figure 3, the upper edge of the tool box is engaged by one edge of the board 13, the edge of the board simply gliding along on the top of the box, until the board 13 lodges in the position indicated.

It will be noted that the links 21, located at the ends of the board 13, serve as guides for the board 13 and parts carried thereby.

When the board 13 is lowered upon the tool box 11, as indicated in Figure 2, the flange 17 and its two portions 18 extend downwardly a little from the top edge of the tool box, but upon three sides thereof only, as above explained. By this arrangement no portion of the flange is hooked over the top of the tool box in such manner as to prevent the board 13 from swinging upward. It follows from the arrangement that the board 13, in moving from the position indicated for it in Figure 2 to the one indicated for it in Figure 3, has a very simple and easy movement, such as is not likely to cause any hitching, binding or halting by any of the movable parts. Moreover, as may be understood from Figure 3, any article thrown carelessly into the tool box is not likely to cling to any portion of the inner cover of the tool box, as no flange or anything of the kind will retard the downward movement of the article.

We do not limit ourselves to the precise construction shown, as variations may be made therein without departing from our invention, the scope of which is commensurate with our claims.

Having thus described our invention, what we claim as new and desire to secure by Letters Patent is as follows:

1. In a device of the character described the combination, with a vehicle body having a metallic frame work, of a pair of supporting arms mounted upon said frame work, a box mounted upon said arms and thus carried by the vehicle, a pair of links pivotally connected with the box, and a cover pivotally connected with said links, said cover serving the double purpose of a covering for said box and a running board for said vehicle body.

2. In a device of the character described the combination, with a vehicle body having a frame work, of supporting arms mounted upon said frame work and each of substantially L-shape, a tool box mounted upon said supporting arms, a pair of links pivotally connected with the ends of said tool box, a board detachably fitted upon said tool box, and bearings connected with said links and with the ends of said boards, so as to connect said board with said tool box and yet allow freedom of movement between said board and said tool box.

3. In a device of the character described the combination, with a vehicle body, of a floor carried by said vehicle body and provided with a downwardly-extending flange portion, supporting arms mounted upon said vehicle body, a tool box mounted upon said supporting arms, a pair of links connected with said tool box, a board connected with said links and guided thereby, said board being movable into two normal positions relatively to said tool box and serving the double purpose of a running board for the vehicle and an outer cover for the tool box, and a covering member carried by said board and detachably engaging the tool box, so as to serve as the inner cover thereof.

4. In a device of the character described, the combination with a vehicle body having a floor provided with a downwardly extending flange portion, supporting arms mounted upon said vehicle body and disposed adjacent said downwardly extending flange portion, a box carried by said supporting arms and mounted rigidly upon the same, a board serving as a cover for said box and as a running board for the vehicle, said board being movable into two positions relatively to said box and being provided with an edge portion for lodging against said downwardly extending portion of said floor when said board occupies one of said positions, and means for guiding said board in its movement relatively to said box.

5. In the device of the character described the combination, with a vehicle body, of supporting arms mounted upon said vehicle body, a box mounted upon said supporting arms, a covering member fitted upon said box and provided with a flange extending around three sides only of said box, and connections from said box to said covering member, for guiding said covering member in its movement relatively to said box.

FREDERICK TICHÝ.
FREDERICK H. WAPPLER.